United States Patent [19]
Yamamoto et al.

[11] Patent Number: 5,136,856
[45] Date of Patent: Aug. 11, 1992

[54] COOLING SYSTEM

[75] Inventors: Haruhiko Yamamoto, Yokohama; Akihiko Fujisaki, Kawasaki, both of Japan

[73] Assignee: Fujitsu Limited, Kawasaki, Japan

[21] Appl. No.: 659,658

[22] Filed: Feb. 25, 1991

[30] Foreign Application Priority Data

Mar. 1, 1990 [JP] Japan ................. 2-49839

[51] Int. Cl.[5] .............................................. H05K 7/20
[52] U.S. Cl. .......................... 62/176.6; 174/15.1; 165/80.2; 236/44 C; 361/382
[58] Field of Search .................... 62/93, 176.1, 176.6, 62/259.2; 165/80.2, 80.3, 80.4, 14, 21; 236/44 R, 44 A, 44 C, 44 E, 46 F, 46 A, 91 R, 91 A, 91 C, 91 D; 174/15.1, 17 GF, 17.05, 17.06, 17.07; 361/381, 382, 383, 384, 385, 390, 391

[56] References Cited

U.S. PATENT DOCUMENTS

| | | | |
|---|---|---|---|
| 3,417,575 | 12/1968 | Stark | 62/259.2 |
| 4,495,780 | 1/1985 | Kaneko et al. | 236/91 A |
| 4,546,619 | 10/1985 | Rohner | 165/80.4 X |
| 4,729,424 | 3/1988 | Mizuno | 174/15.1 |

FOREIGN PATENT DOCUMENTS 1-318295 12/1989 Japan .

Primary Examiner—Harry B. Tanner
Attorney, Agent, or Firm—Nikaido, Marmelstein, Murray & Oram

[57] ABSTRACT

A cooling system comprising an airtight box which accommodates a cooling module and an electronic device which is cooled by the cooling module and has a door which is opened when attending to maintenance of parts within the airtight box, a dew condensation preventing unit for absorbing humidity within the airtight box and/or replacing air or gas within said airtight box when operated, a coolant supply unit for recirculating a coolant between the coolant supply unit and the cooling module, and a controller for operating the coolant supply unit and the dew condensation preventing unit in response to a first instruction signal which instructs a cooling operation, and for heating the electronic device in response to a second instruction signal which instructs the maintenance of the parts within the airtight box, where only one of the first and second instruction signals exists at one time. The controller includes a circuit part responsive to the second instruction signal for supplying an operating signal to the electronic device to operate the electronic device for a predetermined time, so that the electronic device rises to a predetermined temperature due to heat generated by the electronic device itself.

13 Claims, 6 Drawing Sheets

COOLING SYSTEM

BACKGROUND OF THE INVENTION

The present invention generally relates to cooling systems, and more particularly to a cooling system which is designed so that an electronic device and a cooling module are accommodated within an airtight box and the electronic device is cooled by operating a coolant supplying unit.

Recently, in supercomputers or the like, the electronic devices consume large power in order to realize high-speed operations and the electronic devices are equipped with a high density. Hence, in order to guarantee stable operation of the electronic devices, namely semiconductor elements, the electronic devices are cooled by a cooling system. It is desirable that the cooling system cools the electronic devices to a relatively low temperature so as to fully bring out the performances of the electronic devices.

On the other hand, in the case of high-speed elements such as CMOS and HEMT elements which operate at high speeds in a low temperature environment or high-speed elements such as Josephson elements which operate only in a low temperature environment, a coolant such as liquid nitrogen and liquid helium is used to cool the high-speed elements.

Accordingly, in the cooling system which cools the electronic device to the low temperature, dew condensation in liquid form or solid form (ice) easily occurs. Hence, it is important that measures are taken to prevent such dew condensation.

FIG. 1 shows an example of a conventional cooling system. The cooling system includes an airtight box 3, a coolant supply unit 4, a unit 8 or 9, and a heater unit 15. An electronic device 1 is equipped with semiconductor elements, and a cooling module 2 cools the semiconductor elements of the electronic device. The electronic device 1 and the cooling module 2 are accommodated within the airtight box 3 which is made of a heat insulating material. The unit 8 absorbs the moisture within a chamber 3A inside the airtight box 3 to prevent dew condensation. The unit 9 replaces the air or predetermined gas inside the chamber 3A by a predetermined gas to prevent dew condensation when the temperature of the coolant is extremely low. One of the units 8 and 9 is provided depending on the needs. The heater unit 15 is used to raise the temperature within the chamber 3A if needed. A door 3B is provided on the airtight box 3, and the maintenance or removal of the electronic device 1 and/or the cooling module 2 can be made by opening the door 3B.

The coolant supply unit 4 supplies a low temperature coolant 5 to the cooling module 2 within the airtight box 3 via a pipe 21 which is covered by a heat insulating material. The coolant 5 is then returned from the cooling module 2 to the coolant supply unit 4 via a pipe 21. Hence, the coolant 5 is recirculated between the coolant supply unit 4 and the cooling module 2. For example, liquid helium, liquid nitrogen, flon, fluorocarbon or the like may be used as the coolant 5.

The coolant supply unit 4 includes a refrigerator 4B which refrigerates the coolant 5 via a heat exchanger 4A, and a pump 4C for forcibly pumping out the coolant 5 towards the airtight box 3. The pump 4C is driven to recirculate the coolant 5 with respect to the cooling module 2.

Accordingly, the unit 8 absorbs the moisture within the chamber 3A or the unit 9 replaces the air within the chamber 3A by a predetermined gas when starting to cool the electronic device 1, and the heater unit 15 raises the temperature within the chamber 3A to a temperature approximately equal to that outside the chamber 3A when stopping to cool the electronic device 1 so as to attend to the maintenance of the electronic device 1 via the door 3B. As a result, it is possible to prevent the dew condensation in liquid or solid form from occurring when starting and stopping the cooling operation.

The cooling system of the type described above is proposed in a Japanese Laid-Open patent application No. 1-318295, for example.

However, when preventing the dew condensation by driving the unit 8, the coolant supply unit 4 may be operated when the humidity absorption is still insufficient. Similarly, when preventing the dew condensation by driving the unit 9, the coolant supply unit 4 may be operated when the replacement of air by the predetermined gas is not yet completed. In addition, when attending to the maintenance of the electronic device 1, the temperature of the cooled electronic device 1 may greatly differ from the temperature outside the chamber 3A. When the door 3B is opened in such cases, there is a problem in that the dew condensation in liquid or solid form occurs, thereby causing corrosion which deteriorates the performance of the electronic device 1.

Accordingly, in the conventional cooling system, the dew condensation in the form of liquid or solid cannot be prevented unless the cooling operation is started depending on the operating states of the unit 8 or 9 and the electronic device 1 and unless the maintenance of the electronic device 1 is attended to depending on the operating state of the electronic device 1.

In addition, the conventional cooling system also suffers from problems in that the system construction is complex due to the piping and sealing required in connection with the unit 8 or 9 and the heater unit 15 which must be connected to the airtight box 3.

Furthermore, when the heater unit 15 heats the electronic device 1, the heating is made via air or predetermined gas. Hence, a fan must be provided to circulate the heated air or the predetermined gas within the chamber 3A, thereby making the system construction more complex. In addition, because the heating is made via air or predetermined gas, there are problems in that the heating of the electronic device 1 is inefficient and time consuming.

SUMMARY OF THE INVENTION

Accordingly, it is a general object of the present invention to provide a novel and useful cooling system in which the problems described above are eliminated.

Another and more specific object of the present invention is to provide a cooling system comprising an airtight box which accommodates a cooling module and an electronic device which is cooled by the cooling module and has a door which is opened when attending to maintenance of parts within the airtight box, a dew condensation preventing unit for absorbing humidity within the airtight box and/or replacing air or gas within the airtight box when operated, a coolant supply unit for recirculating a coolant between the coolant supply unit and the cooling module, and a controller for operating the coolant supply unit and the dew condensation preventing unit in response to a first instruction signal which instructs a cooling operation, and for heating the electronic device in response to a second instruction signal which instructs the maintenance of the parts within the airtight box, where only one of the first and second instruction signals exists at one time. The controller includes a circuit part responsive to the second instruction signal for supplying an operating signal to the electronic device to operate the electronic device for a predetermined time, so that the electronic device rises to a predetermined temperature due to heat generated by the electronic device itself. According to the cooling system of the present invention, no complex mechanism is required to heat the electronic device when opening the door of the airtight box because the electronic device is heated by the heat generated by itself. In addition, no mechanism is required to circulate the air inside the airtight box in order to effectively heat the electronic device, and the heating efficiency is improved compared to the conventional cooling system. Further, the heating time is minimized because the electronic device is directly heated and not indirectly via air.

Other objects and further features of the present invention will be apparent from the following detailed description when read in conjunction with the accompanying drawings.

DESCRIPTION OF THE PREFERRED EMBODIMENTS

Figure 1:
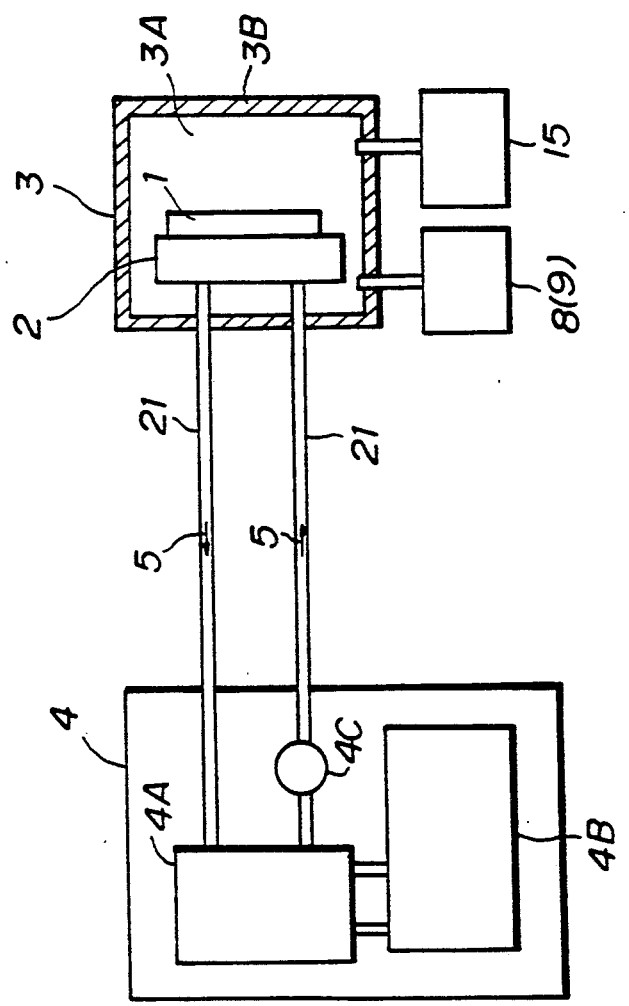
FIG. 1 is a system block diagram showing an example of a conventional cooling system.
Figure 2:
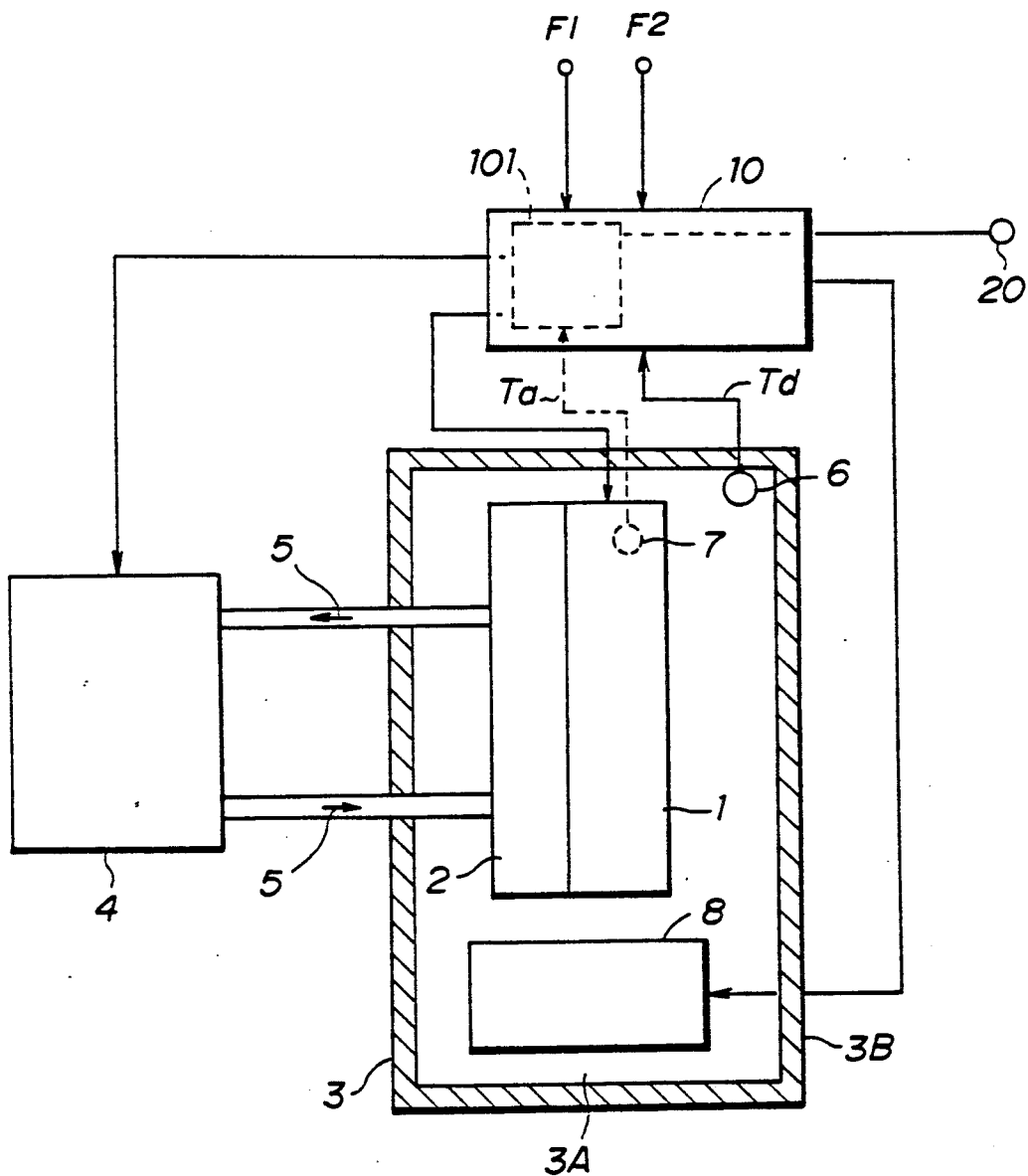
FIG. 2 is a system block diagram generally showing a first embodiment of a cooling system according to the present invention.

FIG. 2 generally shows a first embodiment of a cooling system according to the present invention. In FIG. 2, those parts which are the same as those corresponding parts in FIG. 1 are designated by the same reference numerals, and a description thereof will be omitted.

The cooling system shown in FIG. 2 includes the airtight box 3, the coolant supply unit 4, a controller 10, and a temperature sensor 20. The electronic device 1, the cooling module 2, the unit 8, an absolute humidity sensor 6, and a temperature sensor 7 are provided within the chamber 3A. The absolute humidity sensor 6 detects the absolute humidity within the chamber 3A. The temperature sensor 7 detects the temperature of the electronic device 1. The temperature sensor 20 detects the ambient temperature outside the chamber 3A. The coolant supply unit 4 circulates the coolant 5 between the coolant supply unit 4 and the cooling module 2.

Of course, the unit 9 may be provided externally to the airtight box 3 in place of or in addition to the unit 8, similarly as shown for the conventional cooling system shown in FIG. 1.

Figure 3:
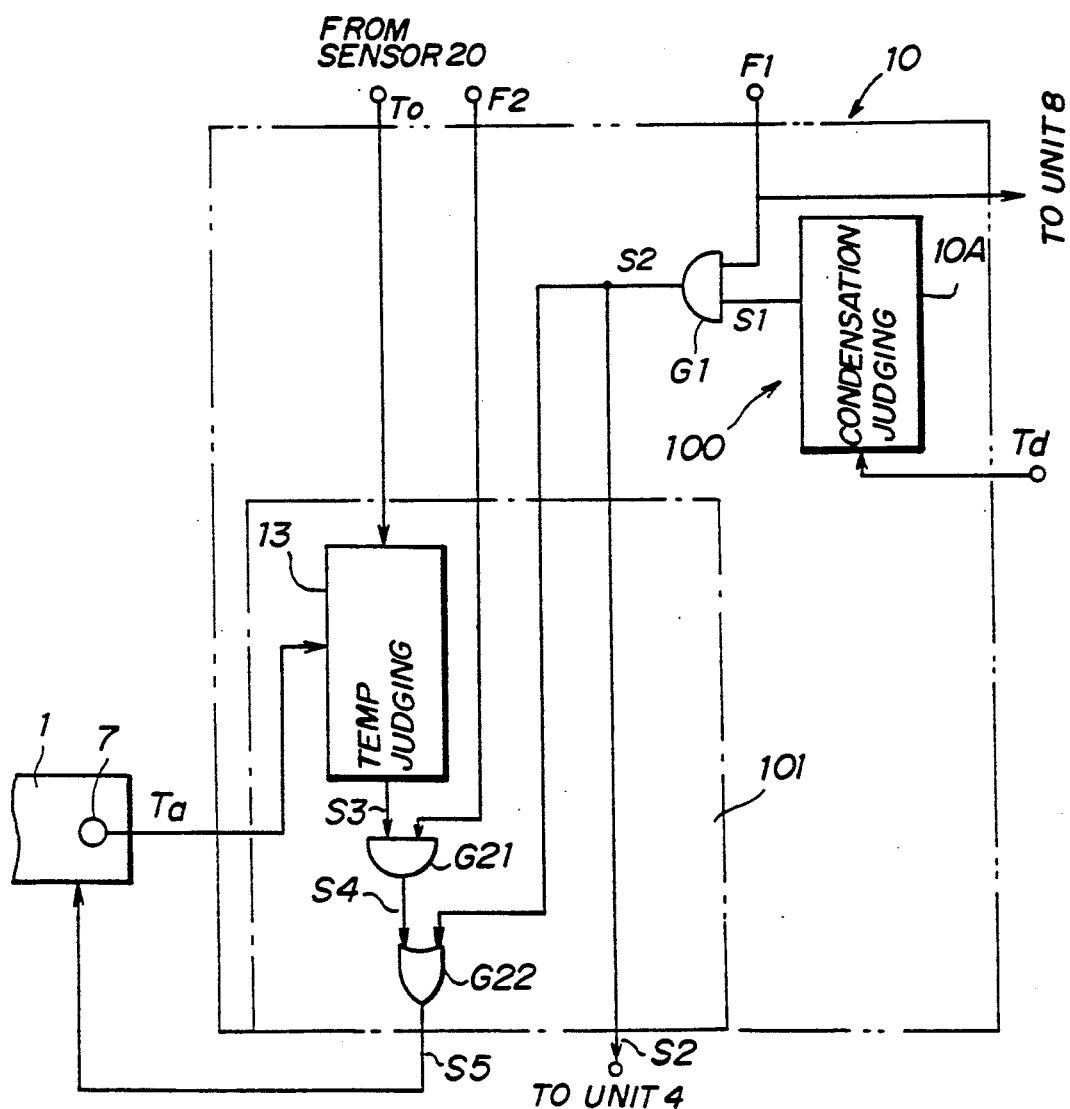
FIG. 3 is a circuit diagram showing an essential part of the first embodiment.

FIG. 3 shows an embodiment of the controller 10 together with a part of the electronic device 1. The controller 10 includes a first control part 100 and a second control part 101.

The first control part 100 includes a dew condensation judging circuit 10A for which judges whether or not the dew condensation will occur based on an output signal Td of the absolute humidity sensor 6, and an AND gate G1 for obtaining an AND of a cooling instruction F1 and an output signal S1 of the dew condensation judging circuit 10A and for outputting a signal S2. The cooling instruction F1 is also supplied to the unit 8. On the other hand, the signal S2 is supplied to the coolant supply unit 4.

Figure 4:
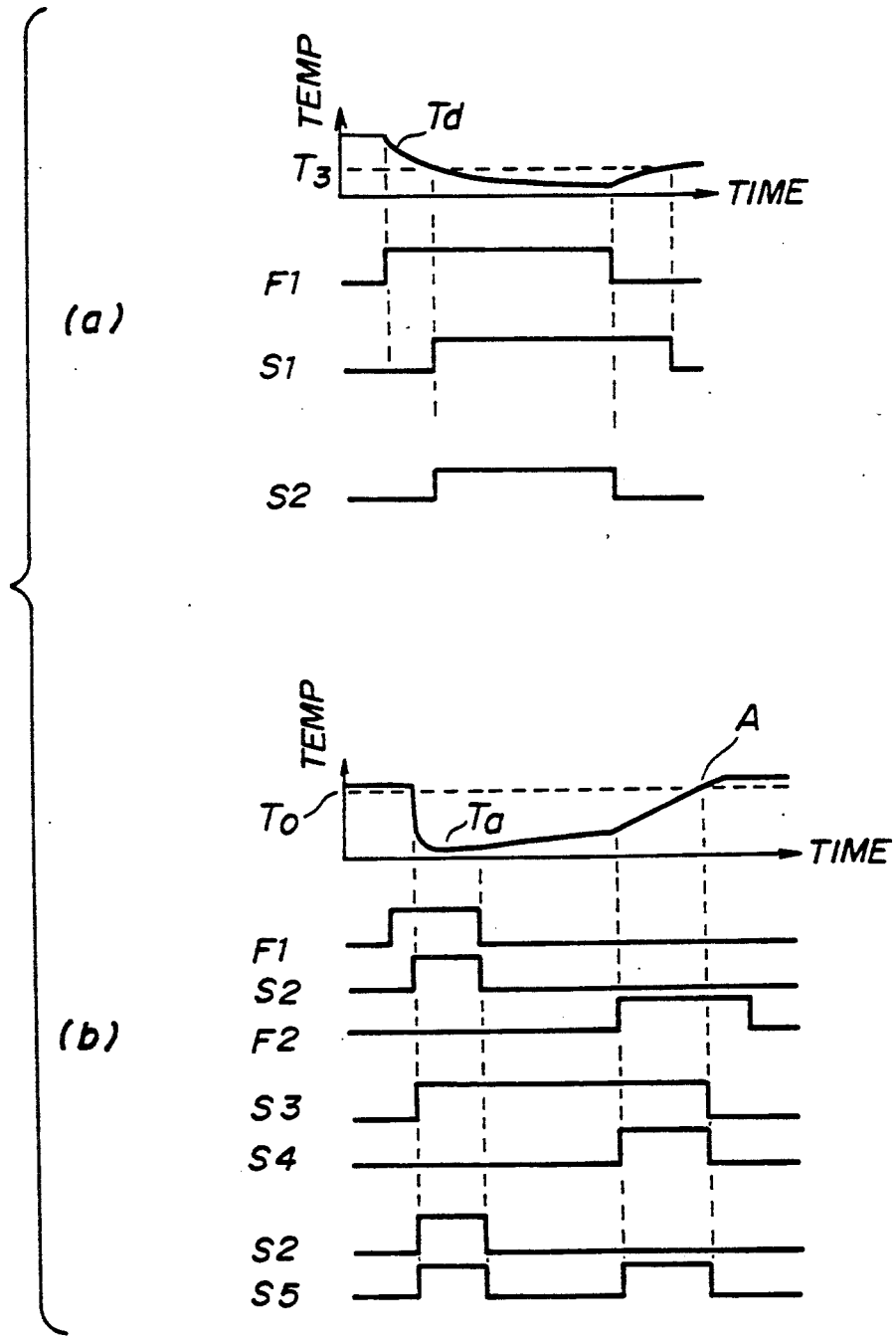
FIG. 4 is a time chart for explaining the operation of the first embodiment.

FIG. 4(a) shows the relationship of the signal Td, the cooling instruction F1, the output signal S1 of the dew condensation judging circuit 10A, and the output signal S2 of the AND gate G1. The dew condensation judging circuit 10A judges that the dew condensation will occur when the absolute humidity is greater than a predetermined value T3, and in this case, the dew condensation judging circuit 10A outputs a low-level signal S1. When the absolute humidity Td decreases due to the operation of the unit 8 responsive to the cooling instruction F1 and the absolute humidity Td reaches the predetermined value T3, the signal S1 changes to a high level. The high level of the signal S1 is maintained until the absolute humidity next rises to the predetermined value T3. The unit 4 and the electronic device 1 are operated during a high-level period of the signal S2.

The second control part 101 includes a temperature judging circuit 13, an AND gate G21, and an OR gate G22. The temperature judging circuit 13 judges whether or not the temperature of the electronic device 1 has reached a predetermined temperature based on the output signal Ta of the temperature sensor 7 and an output signal To of the temperature sensor 20. In this embodiment, the predetermined temperature is the ambient temperature detected by the temperature sensor 20. However, the temperature judging circuit 13 may be designed to calculate the predetermined temperature based on the signal To. A removal instruction F2 is supplied to the AND gate G21 which receives an output signal S3 of the temperature judging circuit 13. The gate G22 obtains an OR of the signal S2 and an output signal S4 of the AND gate G21 and outputs a signal S5 which is supplied to the electronic device 1. The cooling instruction F1 instructs the cooling operation, while the removal instruction F2 instructs the maintenance of the parts within the airtight box 3. For this reason, only one of the cooling instruction F1 and the removal instruction F2 exists at one time, that is, the instructions F1 and F2 cannot assume the high level at the same time.

FIG. 4(b) shows the relationship of the signal Ta, the cooling instruction F1, the signal S2, the removal instruction F2, and the signals S3, S4, S2 and S5. As shown, the temperature judging circuit 13 outputs a high-level signal S3 during a time in which the temperature detected by the temperature sensor 7 is lower than the temperature detected by the temperature sensor 20.

Accordingly, the signal S2 is output in response to the high-level cooling instruction F1 and the electronic device 1 and the coolant supply unit 4 are operated in response to the high-level signal S2. Then, when the cooling instruction F1 changes to the low level to indicate the stop of the cooling operation, the electronic device 1 and the coolant supply unit 4 stop operating in response to the low-level signal S2. When the high-level removal instruction F2 is output thereafter to instruct the removal of the electronic device 1 from the chamber 3A, the AND gate G21 outputs the high-level signal S4 and the OR gate G22 outputs the high-level signal S5 although the cooling instruction F1 has the low level. Hence, the operation of the electronic device 1 is resumed in response to the high-level signal S5 and the electronic device 1 operates until the temperature (Ta) of the electronic device 1 reaches the predetermined temperature (To).

The temperature judging circuit 13 outputs the low-level signal S3 from a time A when the temperature (Ta) of the electronic device 1 reaches the predetermined temperature (To). As a result, the signal S5 changes to the low level, thereby stopping the operation of the electronic device 1.

In other words, when there is a need to open the door 3B in order to attend to the maintenance of the electronic device 1 and/or the cooling module 2 in this embodiment, the electronic device 1 is operated to raise the temperature of the electronic device 1 by the heat generated thereby until the temperature of the electronic device 1 reaches such a temperature that no dew condensation will occur when the door 3B is opened. No heating unit and associated parts are required to raise the temperature of the electronic device 1.

Figure 5:
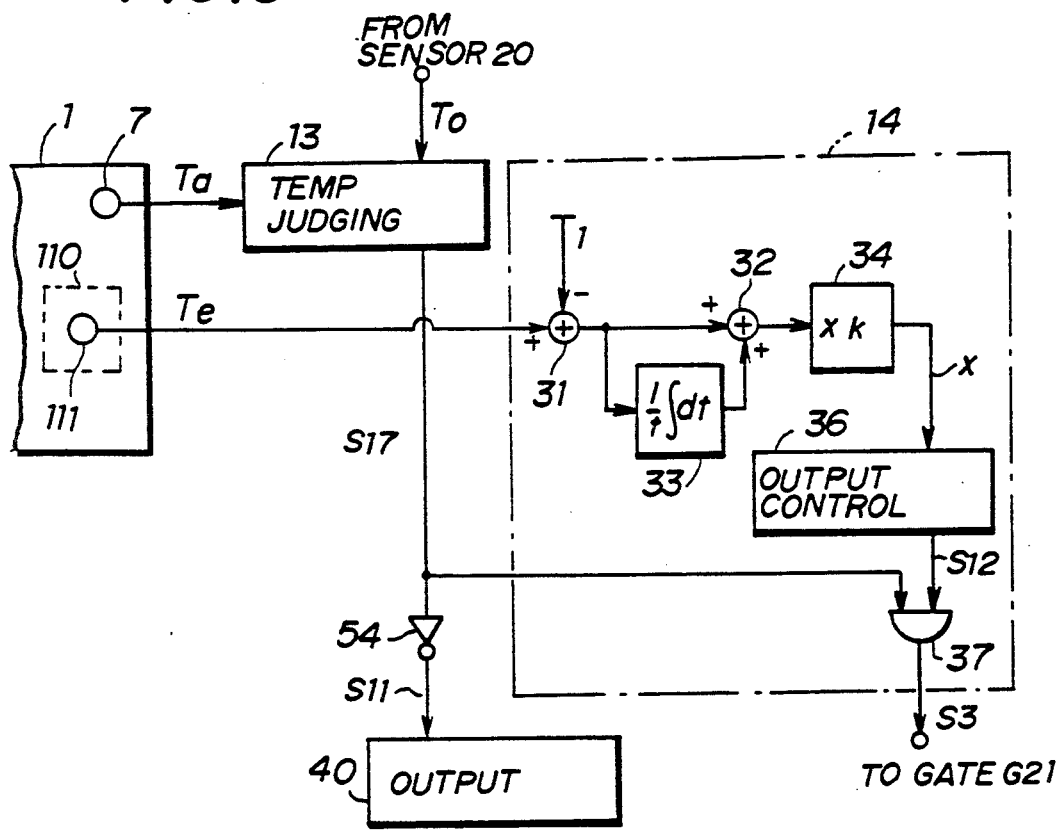
FIG. 5 is a system block diagram showing an essential part of a second embodiment of the cooling system according to the present invention.

Next, a description will be given of a second embodiment of the cooling system according to the present invention, by referring to FIG. 5. FIG. 5 shows an essential part of the second embodiment, and in FIG. 5, those parts which are the same as those corresponding parts in FIG. 3 are designated by the same reference numerals, and a description thereof will be omitted.

In this embodiment, a temperature sensor 111 is provided to detect the temperature of a semiconductor element 110 of the electronic device 1. An output signal Te of the temperature sensor 111 is supplied to an element temperature control circuit 14. On the other hand, the temperature judging circuit 14 outputs a signal S17 based on the output signal Ta of the temperature sensor 7 and the output signal To of the temperature sensor 20. The signal S17 is inverted by an inverter 54, and an output signal S11 of the inverter 54 is supplied to the output circuit 40.

The element temperature control circuit 14 includes adders 31 and 32, an integrator 33, a multiplier 34, an output control circuit 36 and an AND circuit 37. The adder 31 adds the output signal Te of the temperature sensor 111 to a minus of a predetermined temperature T1. In other words, the predetermined temperature T1 is subtracted from the temperature indicated by the signal Te. An output signal of the adder 31 is supplied directly to the adder 32 on one hand, and is supplied to the adder 32 via the integrator 33 on the other. The integrator 33 obtains $[1/T]\int dt$, where T denotes the integration time and $\int dt$ indicates an integration of the output of the adder 31 with respect to time. An output signal of the adder 32 is multiplied by a proportional gain K in the multiplier 34, and an output signal (variable) x of the multiplier 34 is supplied to the output control circuit 36. An output signal S12 of the output control circuit 36 is supplied to the AND circuit 37 which receives the output signal S17 of the temperature judging circuit 13. The output signal S3 of the AND circuit 37 is supplied to the AND gate G21 of the second control part 101 shown in FIG. 3.

Figure 6:
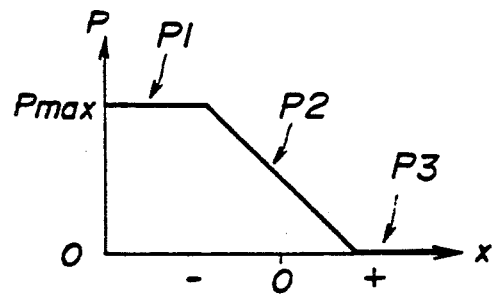
FIG. 6 is a diagram for explaining the operation of the second embodiment.

The signal S12 is a pulse signal, and a time ratio P with which the signal S12 takes the high level is shown in FIG. 6. The output control circuit 36 outputs the signal S12 such that the signal S12 has the pulse form at a portion P1 on the negative side of x and at a portion P2 shown in FIG. 6, and has a low level ("0") at a portion P3 shown in FIG. 6. A maximum value Pmax of the ratio P is restricted within a range from "0" to "1". Control constants such as T, K and Pmax are determined based on the electronic device 1 and the structure and material used for the cooling module 2. According to this embodiment, it is possible to efficiently heat the semiconductor element 110 without excessively heating the semiconductor element 110, even when the thermal transfer from the semiconductor element 110 to the surrounding is relatively poor.

The output circuit 40 may be selected from any notifying means such as an indicator, a display, and an alarm. For example, when the output circuit 40 is an indicator, the indicator is turned ON or OFF in response to the high-level signal S11 to indicate that the door 3B of the airtight box 3 may be opened. On the other hand, the output circuit 40 may be an automatic locking mechanism which normally locks the door 3B but automatically opens the lock when the high-level signal S11 is received from the second control part 101.

Figure 7:
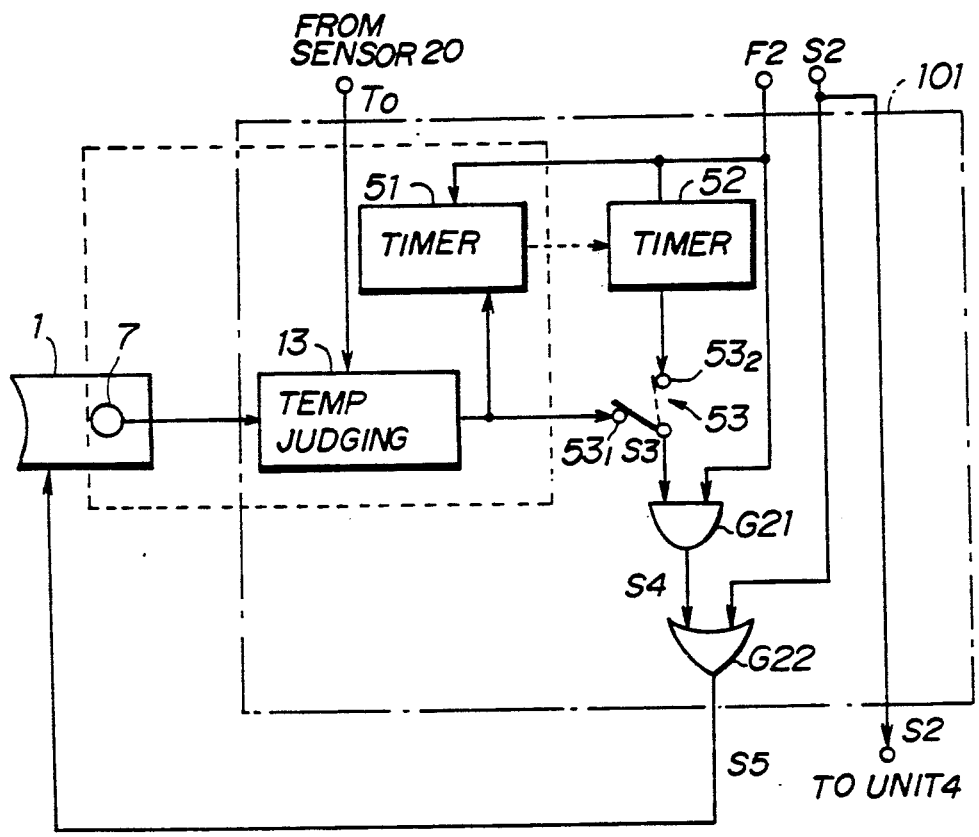
FIG. 7 is a system block diagram showing an essential part of a third embodiment of the cooling system according to the present invention.

Next, a description will be given of a third embodiment of the cooling system according to the present invention, by referring to FIG. 7. FIG. 7 shows an essential part of the third embodiment, and in FIG. 7, those parts which are the same as those corresponding parts in FIG. 3 are designated by the same reference numerals, and a description thereof will be omitted.

In this embodiment, a timer 51 measures a time tm it takes to raise the temperature (Ta) of the electronic device 1 from the time when the removal instruction F2 is received, in a state where a switch 53 is connected to a contact $53_1$. The time tm is set in a timer 52 so that the electronic device 1 is operated for the fixed time tm the next time the removal instruction F2 is received. When the next removal instruction F2 is received, the switch 53 is switched and connected to a terminal $53_2$. The output signal S3 of the switch 53 is supplied to the AND gate G21, and the AND gate G21 outputs the signal S4 based on the signal S3 and the removal instruction F2.

Figure 8:
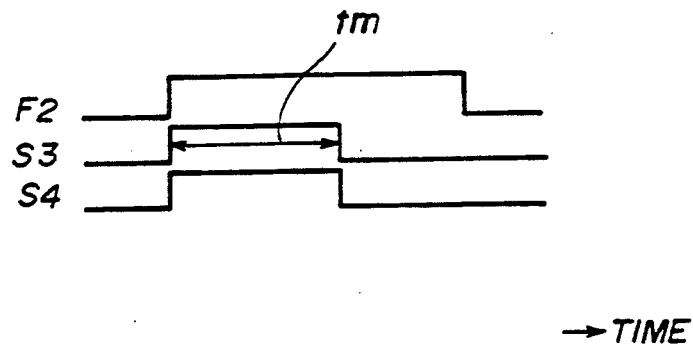
FIG. 8 is a time chart for explaining the operation of the third embodiment.

FIG. 8 shows the relationship of the removal instruction F2 and the signal S3 which is obtained from the timer 52 via the terminal $53_2$ and the signal S4. As shown, the signal S3 has the high level for the time tm which is set in the timer 52 and used in response to the second and subsequent removal instructions F2.

In this embodiment, a part surrounded by a dotted line in FIG. 7 may be omitted after the time tm is set in the timer 52. In other words, when a plurality of identical airtight boxes 3 exist and the electronic devices 1 accommodated therein are also the same, it is sufficient to provide the part surrounded by the dotted line in FIG. 7 for the controller 10 of one airtight box 3, and the controllers 10 of the other airtight boxes 3 simply need to have the time tm set in the timer 52. Hence, by setting the operating time of the electronic device 1 to the fixed time tm which is known from experience, it becomes possible to simplify the construction of the cooling system in that the temperature sensors 7 and 20, the temperature judging circuit 13 and the timer 51 may be omitted.

In addition, although the timers 51 and 52 and the switch 53 are illustrated as being a part of the second control part 101 in FIG. 7, the timers 51 and 52 and the switch 53 may of course be a part of the first control part 100.

Further, the present invention is not limited to these embodiments, but various variations and further modifications may be made without departing from the scope of the present invention.

What is claimed is:

1. A cooling system comprising:
   an airtight box which accommodates a cooling module and an electronic device which is cooled by the cooling module, said airtight box having a door which is opened when attending to maintenance of parts within said airtight box;
   a dew condensation preventing unit for preventing dew condensation by absorbing humidity within said airtight box and/or replacing air or gas within said airtight box when operated;
   a coolant supply unit for recirculating a coolant between the coolant supply unit and said cooling module; and
   controller means for operating the coolant supply unit and the dew condensation preventing unit in response to a first instruction signal which instructs a cooling operation, and for heating the electronic device in response to a second instruction signal which instructs the maintenance of the parts within said airtight box, only one of said first and second instruction signals existing at one time,
   said controller means including circuit means responsive to the second instruction signal for supplying an operating signal to the electronic device to operate the electronic device for a predetermined time, so that the electronic device rises to a predetermined temperature due to heat generated by the electronic device itself.

2. The cooling system as claimed in claim 1, which further comprises a first temperature sensor for detecting a temperature of the electronic device and for outputting a first detection signal, and said circuit means of said controller means supplies the operating signal to the electronic device responsive to the first detection signal to operate the electronic device until the temperature of the electronic device rises to the predetermined temperature, said predetermined time being a variable.

3. The cooling system as claimed in claim 2, wherein said circuit means of said controller means operates the electronic device in response to the second instruction signal after the coolant supply unit stops.

4. The cooling system as claimed in claim 2, which further comprises a second temperature sensor for detecting an ambient temperature outside said airtight box and for outputting a second detection signal, and said predetermined temperature is dependent on the second detection signal.

5. The cooling system as claimed in claim 2, which further comprises a second temperature sensor for detecting an ambient temperature outside said airtight box and for outputting a second detection signal, and said predetermined temperature is the ambient temperature indicated by the second detection signal.

6. The cooling system as claimed in claim 2, which further comprises an absolute humidity sensor for detecting an absolute humidity within said airtight box and for outputting an absolute humidity signal, and said controller means includes judging means for judging whether or not dew condensation will occur within said airtight box based on the absolute humidity signal and means for supplying the first instruction signal to said circuit means only when said judging means judges that the dew condensation will occur.

7. The cooling system as claimed in claim 2, which further comprises notifying means for notifying whether or not the door of said airtight box may be opened in response to a control signal, and said controller means includes means for outputting the control signal when the temperature of the electronic device becomes greater than or equal to the predetermined temperature based on the first detection signal.

8. The cooling system as claimed in claim 2, which further comprises automatic locking means for normally locking the door of said airtight box in a locked state and for automatically unlocking the door in response to a control signal, and said controller means includes means for outputting the control signal when the temperature of the electronic device becomes greater than or equal to the predetermined temperature based on the first detection signal.

9. The cooling system as claimed in claim 1, wherein said controller means includes timer means for supplying the second instruction signal to said circuit means during the predetermined time, said predetermined time being fixed.

10. The cooling system as claimed in claim 9, which further comprises measuring means for measuring a time it takes from a time when the second instruction signal is received to a time when the temperature of the electronic device reaches the predetermined temperature and for setting the measured time into said timer means as the predetermined time.

11. The cooling system as claimed in claim 1, wherein said dew condensation preventing unit includes an absorbing unit for absorbing the humidity within said airtight box when operated.

12. The cooling system as claimed in claim 11, wherein said absorbing unit is accommodated within said airtight box.

13. The cooling system as claimed in claim 1, which further comprises a first temperature sensor for detecting a temperature of the electronic device and for outputting a first detection signal, and a second temperature sensor for detecting a temperature of a semiconductor element of the electronic device and for outputting a second detection signal, and said circuit means of said controller means supplies the operating signal to the electronic device responsive to the first and second detection signals to operate the electronic device until the temperature of the electronic device rises to the predetermined temperature which is a variable and the temperature of the semiconductor element reaches a certain temperature.

* * * * *